July 9, 1940.  H. E. WEAVER  2,207,423
MEASURING APPARATUS
Filed April 23, 1934   5 Sheets-Sheet 1

INVENTOR
Harry E. Weaver.
BY
ATTORNEY

July 9, 1940.   H. E. WEAVER   2,207,423
MEASURING APPARATUS
Filed April 23, 1934   5 Sheets-Sheet 2

INVENTOR
Harry E. Weaver.
BY
Raymond D. Junkins
ATTORNEY

July 9, 1940.  H. E. WEAVER  2,207,423
MEASURING APPARATUS
Filed April 23, 1934  5 Sheets-Sheet 3

INVENTOR
Harry E. Weaver
BY
Raymond D. Jenkins
ATTORNEY

Fig. 8

July 9, 1940.　　　　H. E. WEAVER　　　　2,207,423
MEASURING APPARATUS
Filed April 23, 1934　　　　5 Sheets-Sheet 5

Fig. 9

INVENTOR
Harry E. Weaver.
BY
Raymond W. Jenkins.
ATTORNEY

Patented July 9, 1940

2,207,423

UNITED STATES PATENT OFFICE 2,207,423

MEASURING APPARATUS

Harry E. Weaver, South Euclid, Ohio, assignor to Bailey Meter Company, a corporation of Delaware Application April 23, 1934, Serial No. 721,964

7 Claims. (Cl. 73—206)

This invention relates to apparatus for automatically compensating for changes in condition or quality of a quantity which is to be measured. The quantity to be measured may desirably be a fluid rate of flow and the variable condition or quality of the fluid flow may, for example, be density, pressure, temperature, heat content, or other condition or quality under which the flow is measured or upon which measurement of the flow depends or to which it is to be referred.

Integrating flow meters are usually calibrated to be read in terms of weight, as for example, pounds per hour at predetermined density conditions of temperature and pressure. Such meters may be of a type wherein a differential pressure, bearing a known relation to the rate of flow, is produced by the flow through a constriction, such as an orifice, flow nozzle or a Venturi tube, in the conduit. The actual weight of the fluid flowing through the restriction is not only a function of the difference in pressure at opposite sides of the restriction, but for any given value of pressure differential, varies with the density of the fluid.

A primary object of my invention is to provide a simplified compensator for a rate of flow meter to automatically and continuously compensate for variations in density of the flowing fluid.

Another object is to provide means for continuously taking into account, in the measurement of a variable, the variations in conditions or deviations from predetermined conditions upon which the measurement is based, or to which the measurement is to be referred.

A further object is to continuously provide a measurement such as, for example, B. t. u., which is dependent, not only upon the rate of supply of a quantity, but also upon one or more variable qualities or conditions of the quantity.

Further objects will become apparent from a study of the drawings and specification to follow, as well as the claims appended thereto, which are not to be limited by the specific embodiments illustrated and described.

Figure 1:
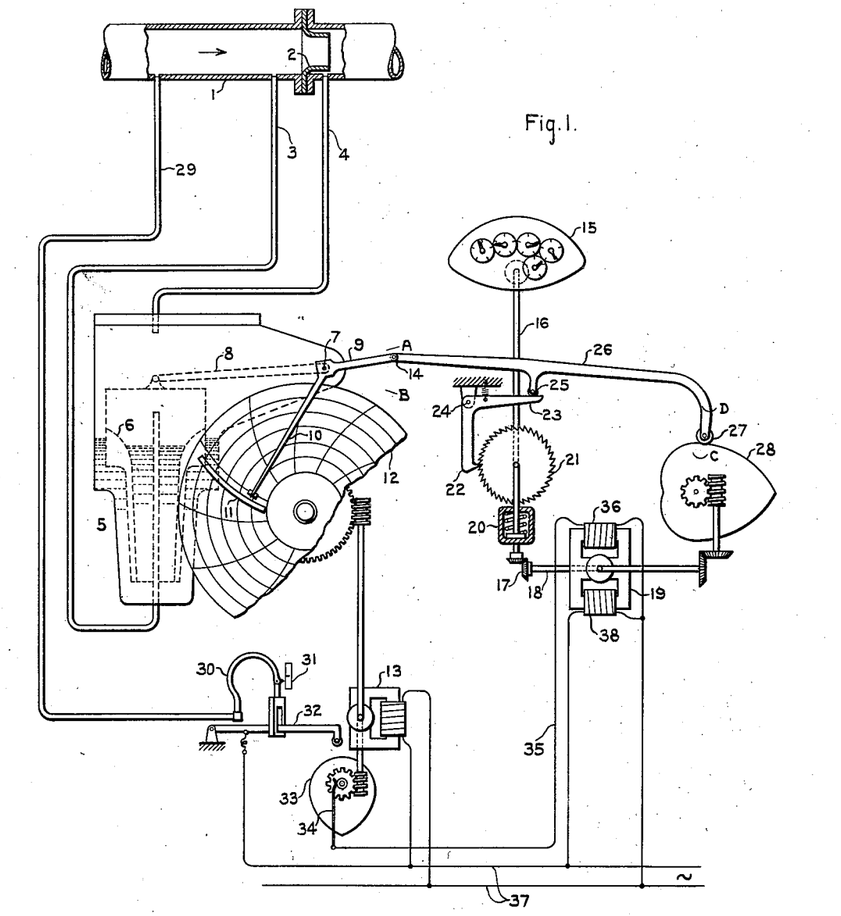
Fig. 1 represents diagrammatically a fluid flow meter whose integrator is continuously compensated for variations in pressure of the fluid.

A variable, such as the rate of flow of a fluid through the conduit 1, is desirably integrated with respect to time to give a total quantity of the fluid passing a given point during a specified interval of time, such as the interval between two readings of the register. I show positioned within the conduit 1, a flow nozzle 2, forming a restriction to flow through the conduit and for creating thereby a pressure differential across the flow nozzle bearing a known relation to the rate of fluid flow therethrough. From the conduit 1, at opposite sides of the flow nozzle 2, I lead the pressure pipes 3 and 4 to a rate of flow meter indicated in general at 5.

Such a rate of flow meter may be of the liquid sealed bell type as disclosed in the patent to Ledoux 1,064,748, wherein the bell is shaped and has walls of material thickness, to the end that the positioning of the bell is in direct proportion to the rate of fluid flow, thereby correcting for the quadratic relation which exists between rate of fluid flow through such a flow nozzle and differential pressure resulting therefrom. The bell is shown at 6 diagrammatically in dotted lines, and may be sealed by a liquid such as mercury whose approximate level within and without the bell is indicated.

Pressure within the conduit 1 ahead of the flow nozzle 2 is effective through the pipe 3 upon the interior of the bell 6, while pressure at the outlet of the flow nozzle 2 is effective through the pipe 4 upon the exterior of the bell 6, to the end that the bell is positioned vertically by the pressure differential across the flow nozzle and in linear relation to the rate of flow of the fluid.

Such vertical positioning of the bell results in angular positioning, about a fixed fulcrum point 7, of an arm 8 for transmitting motion from the bell to the shaft of the fulcrum 7, for positioning an arm 9 whose function will be explained hereinafter, and for positioning an indicating pen and pointer 10 cooperating with an index 11.

The pen 10 is further adapted to record over a circular recording chart 12 which is desirably driven uniformly at a constant speed by a motor 13 which is shown as a synchronous alternating current electric motor. The motor may be a spring wound motor such as a clock, or otherwise, and provided with the necessary gear reduction which I have felt it not necessary to illustrate in great detail.

I have shown the flow meter 5 in a position indicating a rate of flow approximately 20% of maximum, wherein the free end 14 of the arm 9 is in the shown position intermediate the extremes of its travel A—B which respectively indicate the position of the point 14 at zero rate of flow and at maximum rate of flow.

I provide in connection with the flow meter 5, a register 15 having graduated dials and pointers moving in conjunction therewith, for affording a continuously available means of reading the accumulated total of the flow of the fluid through the conduit 1, which total flow for any desired interval of time may be obtained by subtracting the reading of the dials of the register 15 at the beginning of the interval from the reading of the dials at the end of the interval, the difference between such readings representing the total flow between the beginning and the end of the interval of time. The arrangement being such that the total is the integration of the rate of flow of fluid with respect to time.

For driving the register 15, which in itself contains the necessary gear reduction between dials, I provide a driven integrating shaft 16 driven through the bevel gears 17 by a constant speed driving shaft 18 adapted to be driven at a uniform speed in one direction by a motor 19. Interposed in the shaft 16 is a friction means 20 wherein the shaft 16 is actually broken but the two parts are held in frictional engagement by means of a spring, to the end that if that part of the shaft 16 connected to the register 15 is locked or held against rotation, the friction means will slip, allowing the motor 19 to continue to rotate the shaft 18 and that part of the shaft 16 connected thereto through the bevels 17.

To provide a means for locking or unlocking that part of the shaft 16 connected to the register 15, I provide a locking wheel 21 positioned on the shaft 16 between the friction means 20 and the register 15 and adapted to turn with the shaft 16 when unlocked through disengagement of a pawl 22. The pawl 22 forms an extension of a part 23 pivoted at 24 and so arranged that normally the pawl 22 is in engagement with the teeth of the locking wheel 21 for holding the locking wheel against rotation.

The arrangement is such that to allow an actuation of the register 15, I unlock the locking wheel by mechanically moving out of engagement therewith the pawl 22, and when the locking wheel is unlocked, the friction means 20 causes a driving of the register at a constant rate of speed by the motor 19. I desirably unlock the locking wheel periodically and for a time portion of each period, of a length determined not only by the value of the variable (rate of fluid flow) at the beginning of the period, but modified by any change in the value of the rate of flow during that portion of the period when the locking wheel is unlocked. That is, at the beginning of each period of time, I cause an unlocking of the locking wheel and the portion of the period during which the locking wheel is unlocked for driving is determined by the rate of flow at the beginning of the period, but the portion is modified by any change in the rate of flow which occurs during the portion.

To unlock the locking wheel, by causing a disengagement therefrom of the pawl 22, I provide the part 23 against which bears a roller 25 carried by a freely floating member 26 capable of being positioned along a definite path in a single plane in space. The member 26 is pivotally connected at one end to the arm 9 of the flow meter at 14, so that that end of the member 26 is at the position A when there is zero flow through the conduit 1 and at a position B when there is maximum flow through the conduit 1, thus traversing a predetermined path in a single plane in space.

The opposite end of the member 26 carries a roller 27 which, by gravity, bears against and in contact with the surface of a cam 28 in a manner such that that end of the member 26 is continually reciprocated at a substantially uniform speed between the limits of travel C and D by rotation of the cam 28 as driven by the motor 19. It will be seen, then, that the member 26 is arranged for positioning along a definite path, within limits of travel, in a single plane and such that movement of the member is angularly about either end by the positioning of the opposite end between definite limits of travel, to the end that the roller 25 assumes a position between limits of travel in dependence upon the position of the point 14 and of the roller 27.

Thus, at any given rate of flow corresponding to a definite position of the point 14, the roller 25 is reciprocated along a definite path in the plane of movement of the member 26 and by the reciprocation between the limits C and D of the roller 27. When the rate of flow is zero and the point 14 is at the location A, then the reciprocation of the roller 25 through the reciprocation of the roller 27 will not cause engagement between the roller 25 and the extension 23. However, when the point 14 is at B, then the roller 25 may bear against the extension 23 throughout the entire or major portion of the reciprocation of the roller 27 between the points C and D.

It will be seen that when the roller 25 engages the extension 23, the pawl 22 is disengaged from the locking wheel 21 and the friction means 20 allows the motor 19 to drive the register 15. Thus, the length of time through which the locking wheel is unlocked and the register 15 is being driven, is determined by that portion of the time cycle of the cam 28 through which the roller 25 engages the extension 23, and such portion is determined by the position of the point 14 along the path A—B.

As the cam 28 is rotated, the position of the point 14 determines what portion of such rotation is used for driving the register 15, but the drive is continually modified through the fact that the point 14 is free to change its position along the path A—B during actuation of the register 15. Thus, the increment of movement of the register 15 for each revolution of the cam 28, that is, for each time interval, is a function of the rate of flow throughout that interval.

Certain features so far described are illustrated and claimed in the patent to H. H. Gorrie 1,892,183 granted Dec. 27, 1932.

A rate of flow meter, such as that illustrated at 5, is usually designed to read in weight equivalent of volume at a density corresponding to certain temperature and pressure or other conditions. If steam is flowing through the conduit 1, then the register 15 is adapted to continuously integrate, in terms of pounds, the amount of steam which is passed through the flow nozzle 2 for any designated interval of time so long as the density of the steam remains that for which the meter and integrator are calibrated. Assuming that pressure only of the steam is apt to vary from design value, then I have illustrated in Fig. 1 an improved method and means for continuously compensating the integration of flow for the variation in the steam pressure from design value.

At 29 I illustrate a pipe joining the conduit 1 in advance of the flow nozzle 2, and arranged to transmit static pressure of the steam to a Bourdon tube 30 having a pointer adapted to cooperate with an indicating scale 31 relative to a particular graduation corresponding to the pressure to which the meter is calibrated.

The Bourdon tube 30 is additionally adapted to angularly move a contact arm 32, pivoted at one end, and carrying a roller at the other for possible engagement with a continuously rotated cam 33.

The cam 33 is driven at a constant speed by the motor 13, and through a brush 34 and conductor 35, is connected to one field 36 of the motor 19. The contact arm 32, the other terminal of the field 36, and both terminals of the field 38 are connected to a power source 37.

The motor 19 is of a type having equal opposed fields 36, 38 wherein when both fields are energized, the rotor is not urged to rotation, while when the field 36 is de-energized, the rotor rotates at a uniform speed continuously in predetermined direction so long as only the field 38 is energized. When the field 36 is again energized, the sudden application of equal opposing torque plugs the rotor to a substantially instantaneous stop without over-travel or drifting.

The pressure compensator including the Bourdon tube 30, contact arm 32, and the contact cam 33, are arranged to periodically close-circuit the field 36, thereby energizing the field and plugging the motor 19 to a stop and interrupting thereby the drive to the cam 28 and to the driving shaft 18.

In general, the showing is of the integration of a variable with respect to time, to periodically interrupt the time motor for intervals dependent upon whether the pressure of the steam corresponds to the desired pressure or deviates therefrom and in accordance with the amount of deviation.

If the steam pressure is at the desired value, then the indicator of the Bourdon tube 30 will be opposite the proper graduation on the index 31 and the contact arm 32 will be lifted away from the cam 33 to an extent wherein complete revolution of the cam 33 fails to engage the roller of 32 and thus the field 36 of the motor 19 is continuously de-energized and the motor rotates without interruption, providing continuous reciprocation of the roller 27. If, however, for example, the pressure of the steam is less than desired, then the Bourdon tube contracts and the pointer moves relative to the index 31 below the desired value, thereby lowering the contact roller of 32 which is, then, engaged by the contact cam 33 throughout a definite portion of its rotation and correspondingly, a certain percentage of the cam cycle of 33 is effective to energize the field 36 of the motor 19. Thus, the integrator or timing motor 19 is stopped for a portion of each time cycle of the cam 33 and such stopped or dead portion depends on the amount of compensation desired, in turn depending upon the value of steam pressure relative to the desired steam pressure.

Figures 3, 5:
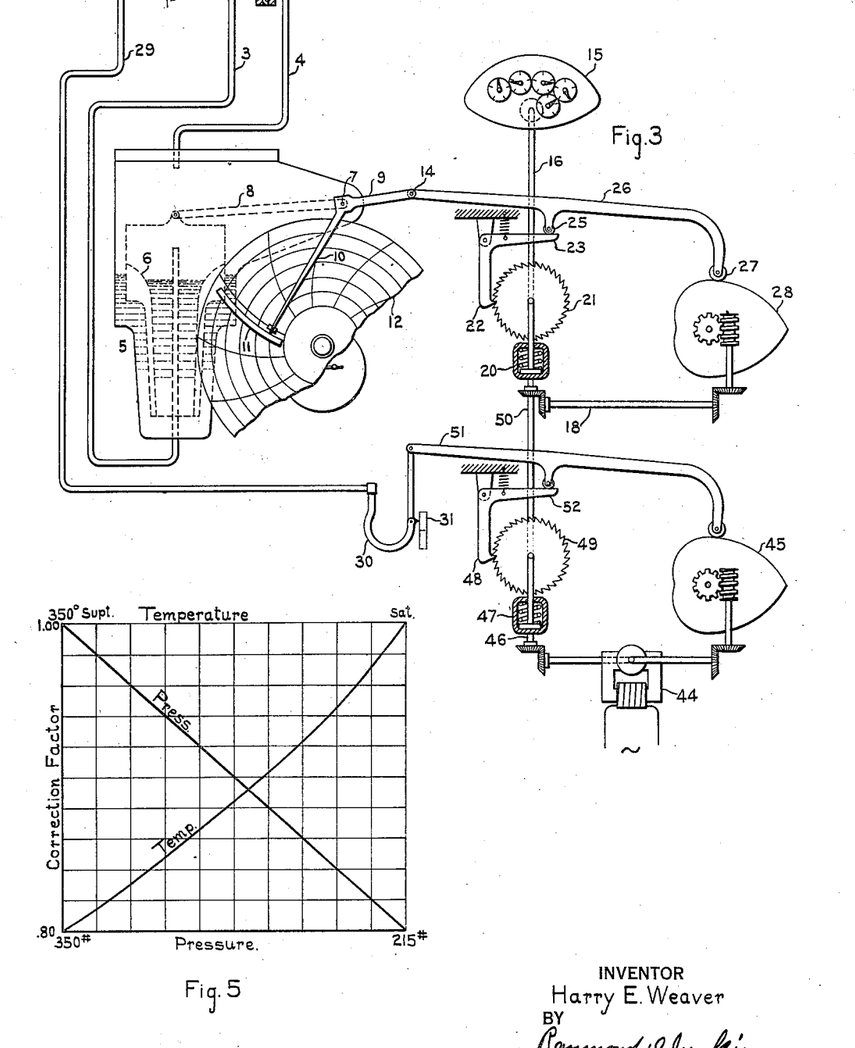
Fig. 3 is similar to Fig. 1 but illustrates a modification thereof.
Fig. 5 shows a graph of correction values for variations in temperature and pressure of steam.

I have illustrated at Fig. 5 a graph of correction factors for both temperature and pressure variations from desired standard. Where a meter is designed to read in pounds equivalent of cubic feet at a density corresponding to certain temperature and pressure values, then if temperature increases, the integrator results must be multiplied by a correction factor of less than unity and vice versa. If pressure decreases, then the readings must be multiplied by a correction of less than unity and vice versa.

From Fig. 5 it will be seen that if design conditions include pressure at 350 lb. per sq. in. gage corresponding to a correction factor of unity or 1.00, then if pressure decreases, for example, to a value of 215 lb. per sq. in. gage, there will be necessary a correction factor of .80 to be applied. Intermediate pressures will call for some correction factor intermediate 1.00 and .80. Furthermore, this graph of pressure correction factor is not necessarily a straight line.

On the same graph, I have illustrated correction factors necessary for departure from predetermined value of temperature. For example, if the meter is designed for saturated steam with a correction factor of 1.00 and the steam temperature increases to a value of 350° superheat, a correction of .80 will be necessary.

The cam 33 may be shaped to have a uniform rise characteristic or such that the length of contact between the cam and the roller of 32 is proportional to the square root of the ratio of the design pressure to the actual pressure. Due to the non-linear relation between pressure and specific volume, the cam may easily be modified so that the length of contact will be proportional to the square root of the ratio of the actual to the design specific volume. It is, of course, to be understood that the cam shape may be made of any desired contour to accomplish the correction of different characteristics or values.

So far the assumption has been that for maximum rate of flow, at design pressure, the driven shaft 16 would be in continuous rotation at a uniform speed. A correction factor of less than unity for periodically stopping rotation of the shaft 16 has been described.

The more practical condition, however, will be one in which it is possible for the pressure to deviate either above or below the predetermined value and therefore it may be necessary at one instant to apply a correction factor of less than unity and at another instant to apply a correction factor greater than unity. To take care of this condition, it is only necessary to so calibrate the apparatus and arrange the necessary speeds and gear reduction that a maximum rate of flow at design pressure gives proper totalization on the register 15 for, say, 80% of each time cycle of the cam 28. With this arrangement, when the contact arm 32 is at a position representative of the desired or design pressure, it would be engaged by the cam 33 for approximately 20% of each cam cycle, thus interrupting the time cam 28 for 20% of the time. If the steam pressure became greater than desired, indicating an increase in steam density and the desirability of applying a correction factor greater than unity, then the engagement between the contact arm 32 and the cam 33 would be less than 20% of each cam cycle, and the cam 28 would rotate for more than 80% of the time. Similarly, if pressure dropped below predetermined value, thereby causing an engagement between the contact arm 32 and the contact cam 33 more than 20% of each cam cycle, then the cam 28 would rotate less than 80% of the time.

Figure 6:
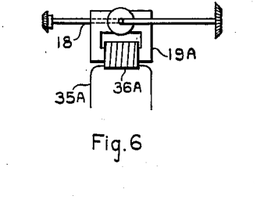
Fig. 6 illustrates an electric motor comprising a modification of a part of Fig. 1.
Figure 7:
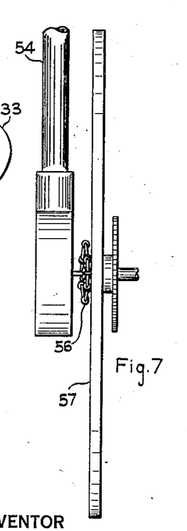
Fig. 7 is a side elevation in the direction of the arrows along the lines 7—7 of a part of Fig. 4, and to enlarged scale.

While I preferably illustrate the motor 19 as having opposed fields 36, 38, it is possible that a single field motor, such as that illustrated in Fig. 6, may be used. Herein the motor 19A has a single field 36A, one lead of which goes to the power source 37 while the other, indicated at 35A, corresponds to the conductor 35 of Fig. 1 leading to a brush 34. The motor 19A is periodically energized or de-energized, dependent upon the value of the steam pressure within the conduit 1.

In principle the integrator without compensation acts to divide time into periods of constant length, equal to the time required for a complete revolution of the cam 28, and to advance the register 15 at a constant speed for an increment of each time period proportional to the rate of flow existing during that increment of time. This advance is proportional to the total flow during the period for:

$$\frac{TF_0}{\Delta t} = \frac{\text{rate} \times \Delta t}{\Delta t} = \frac{A}{\Delta t} \quad (1)$$

where:

$\Delta t$ = time required for each revolution of the cam 28 (constant)
A = integrator advance per increment of time $\Delta t$
$TF_0$ = Total flow.

Now if during the time $\Delta t$ a condition such as pressure or temperature affecting the measurement of the flow has a value different than the design value then the correct total flow is:

$$\frac{TF_c}{\Delta t} = \frac{TF_0 \, C_p}{\Delta t} \quad (2)$$

where:

$C_p$ = A correction factor
$TF_c$ = Corrected total flow substituting in (1)

$$\frac{TF_0 \, C_p}{\Delta t} = \frac{A}{\Delta t} C_p$$

$$\frac{TF_c}{\Delta t} = \frac{A}{\frac{\Delta t}{C_p}}$$

$$\frac{TF_c}{\Delta t} = \frac{A}{\Delta t + \Delta t f C_p} \quad (3)$$

By construction the integrator modifies the increment of time $\Delta t$ in accordance with Equation 3. It is apparent that the total advance from a time $t_1$ to a time $t_2$ will be:

$$\frac{TF_c}{(t_2-t_1)} = \sum_{t_1}^{t_2} \frac{A_1}{\Delta t + \Delta t f C_{p_1}} + \frac{A_2}{\Delta t + \Delta t f C_{p_2}} + \frac{A_3}{\Delta t + \Delta t f C_{p_3}}$$

where:

$A_1$; $A_2$; $A_3$ = integrator advance during successive increments of time $(\Delta t + \Delta t f C_p)$
$C_{p1}$; $C_{p2}$; $C_{p3}$ = correction factors for the existing pressures during the coexisting increments of time $(\Delta t + \Delta t f C_p)$ In Fig. 2, I illustrate the compensation for both pressure and temperature deviations from design standard. The arrangement for pressure compensation is the same as that described relative to Fig. 1. Additionally, I illustrate a Bourdon tube 39 sensitive to temperature of the steam within the conduit 1 for positioning a pointer relative to an index 40 and a contact arm 41 angularly about a fixed pivot, with a contact roller adapted to engage the contact surface of a cam 42 energized through a brush 43. Preferably I stagger cams 33, 42 by 180° and arrange the gearing such that at greatest expected compensation the close-circuited time of the cams 33 and 42 will not overlap.

Figure 2:
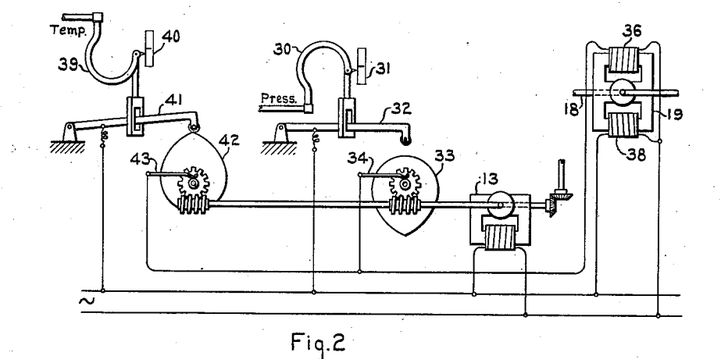
Fig. 2 illustrates the compensation for variations in both temperature and pressure.

If, for example, pressure deviates to less than the design pressure, contact arm 32 will engage the cam 33 for a certain period of each cam rotation, thereby stopping the motor 19 for a definite interval of time. Correspondingly, if the temperature increases relative to design temperature, then for a portion of each revolution of the cam 42 the motor 19 will be stopped. Thus for each revolution of the cams 33, 42 together, there would be a portion of the revolution controlled by pressure, for stopping the motor 19, and a portion of the same revolution controlled by temperature, for stopping the motor 19.

At Fig. 3, I illustrate an embodiment wherein the drive to the cam 28 is more of a mechanical nature than the electric motor 19 of Fig. 1. The constantly rotating motor 44 is connected across an alternating current source, and continuously rotates a cam 45, as well as a shaft 46 and part of a friction device 47. When the locking wheel 49 is released by the pawl 48, the rotation is transmitted through to the shaft 50, friction device 20 and shaft 18.

For controlling the pawl 48 I provide a freely floating member 51, having a roller intermediate its ends for engaging an extension 52 of the pawl arm. One end of the member 51 is positioned by the Bourdon tube 30 responsive to pressure within the conduit 1, whereas the other end is periodically reciprocated by the time cam 45.

The arrangement is such that if pressure within the conduit 1 is at design value, then the Bourdon tube 30 positions its connected end of the member 51 to a point where continuous reciprocation of the opposite end of the member 51 allows the shaft 46 to drive the shaft 50 all or a major portion of the time, and correspondingly, rotates the cam 28. Movement of the shaft 50 is transmitted to the shaft 16 under control of the member 26 as clearly described in connection with Fig. 1. If pressure is other than designed, then the positioning of the member 51 controls the percentage of the time wherein motion is transmitted from shaft 46 to the shaft 50.

Figure 4:
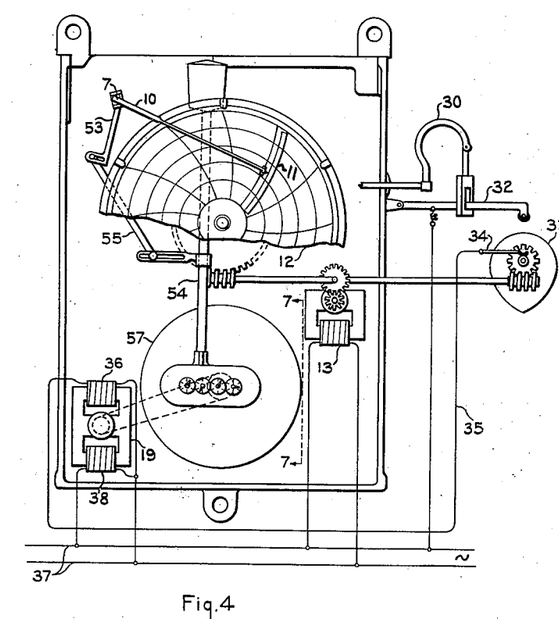
Fig. 4 illustrates diagrammatically the invention applied to a different type of flow meter.

At Fig. 4 I illustrate a pressure compensator similar to Fig. 1, except applied to a different type of integrator, namely, that type of integrator disclosed in the patent to Bailey 1,190,701. Herein an arm 53 is angularly positioned simultaneously with the pointer 10 around the pivot 7, and is adapted to swing an integrator pendulum 54 angularly about a pivot adjacent its upper end. Intermediate the arm 53 and the pendulum 54 is shown a pivoted link 55 with necessary means for adjustment relative to 53, 54. At the lower end of the pendulum 54 is an integrator or register assembly having a cantilever spring supported roller wheel 56, adapted to be moved from the center toward the right across the face of a friction disc 57, which latter is continuously rotated at uniform speed by the motor 19 when the motor is energized for rotation.

When the rate of flow is zero, then the pendulum 54 assumes its furthermost position to the left in clockwise rotation and the roller wheel 56 engages the disc 57 at the center of the disc, so that regardless of the number of times that the disc 57 is revolved, there will be no adding up or registering upon the integrating device. As the rate of flow increases from zero, the pendulum 54 swings in a counter-clockwise direction, with the contact point of the roller wheel 56 engaging a continuously greater circle of travel, and while the disc 57 is rotated at a constant speed, the register will add up proportionate to the rate of flow between zero and the maximum.

The pressure compensator comprising the Bourdon tube 30, the contact arm 32, and the contact cam 33, is adapted, as in Fig. 1, to interrupt the field 36 of the motor 19 periodically for increments of time, dependent upon the value of the pressure.

Figure 8:
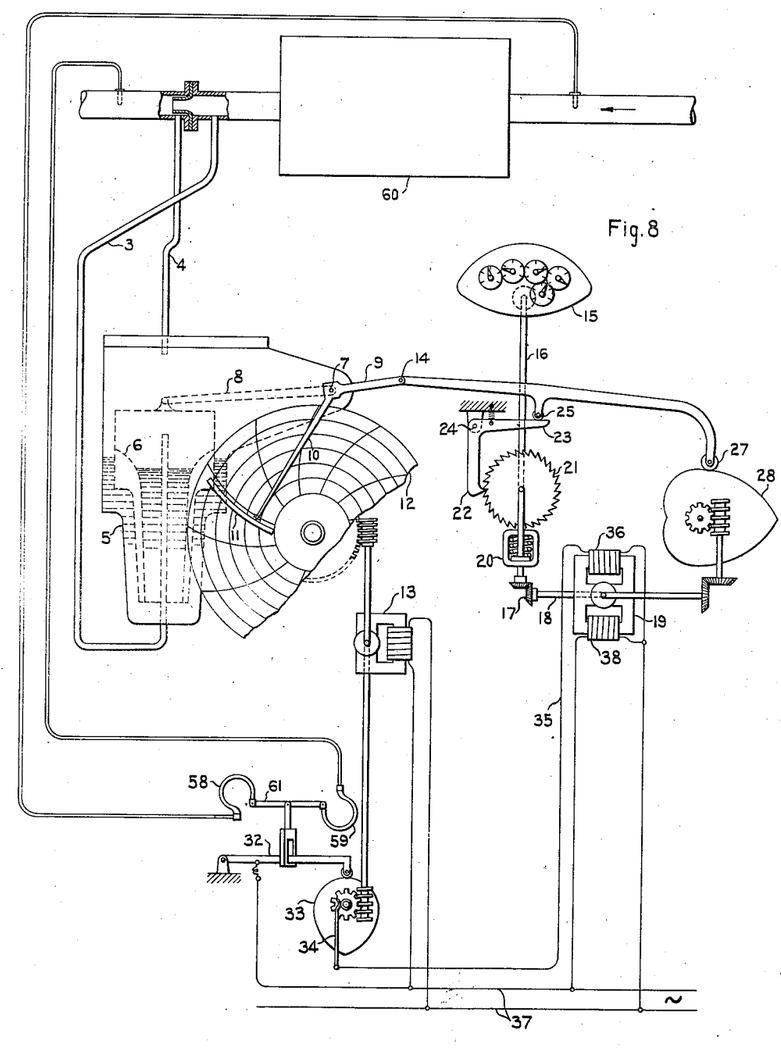
Fig. 8 diagrammatically illustrates an embodiment of the invention in connection with the measurement of B. t. u. dissipated from a radiating surface.

In Fig. 8 the arrangement is similar to that of Fig. 1, except that the contact arm 32 is positioned jointly by Bourdon tubes 58, 59, sensitive respectively to temperatures at the inlet and outlet of a radiating device 60. The arrangement is contemplated to give a result on the register reading in B. t. u. radiated from the device 60. That is, the device 60 may be a hot water heating surface through which water is passed at an entering temperature indicated by the position of the Bourdon tube 58 and leaves at a temperature indicated by the Bourdon tube 59, the rate of flow being measured by the meter 5.

As the register 15 is to totalize the B. t. u., it depends upon temperature difference entering and leaving the device 60, in connection with time, and rate of flow, and if there is no temperature difference, then it matters not what the rate of flow is.

The arrangement is such that the compensating contact arm 32 is engaged by the cam 33 at all times to complete the circuit to the field 36 and thus prevent rotation of the motor 19, regardless of rate of flow, so long as there is no temperature differential between the incoming and outgoing water. If, however, the temperature at the exit as indicated by the Bourdon tube 59 is lower than the temperature of the water entering the device 60, then the Bourdon tube 59 will contract, raising the contact arm 32 a certain amount, and thereby releasing energization of the field 36 throughout a portion at least of each cycle of the cam 33, and allowing the register 15 to totalize B. t. u., dependent upon the rate of flow and the temperature differential.

Inasmuch as it is impossible in the illustrated system for the outgoing temperature to be greater than the incoming temperature, there will never be a tendency for lowering the contact arm 32 below a point indicated by equality of temperature. Such equality is shown by a predetermined position of the neutral point of the equalizing link 61 connected between, and freely floating from the Bourdon tubes 58, 59. Regardless of the specific value of the temperatures indicated by the Bourdon tubes, this neutral point will remain in the same physical position, even though the bar 61 is not horizontal but may be inclined in one direction or the other. For example, if both inlet and outlet temperatures increase by the same amount, then the right hand end of the bar 61 will be lowered and the left hand end raised a proportionate amount, while the point of suspension from the bar 61 to the contact arm 32 remains in the same position. It is only when the temperatures are unequal and when the temperature to which the tube 59 is sensitive is less than that to which the tube 58 is sensitive that the contact arm 32 will be raised from its lowermost position.

The arrangement may be used for a heater rather than a radiating surface whereby the temperature at the exit of the device 60 is greater than the temperature of the inlet, and to totalize the B. t. u. absorbed, then it would only be necessary to interchange the relative connection of the Bourdon tubes 58, 59 to the floating bar 61.

Figure 9:
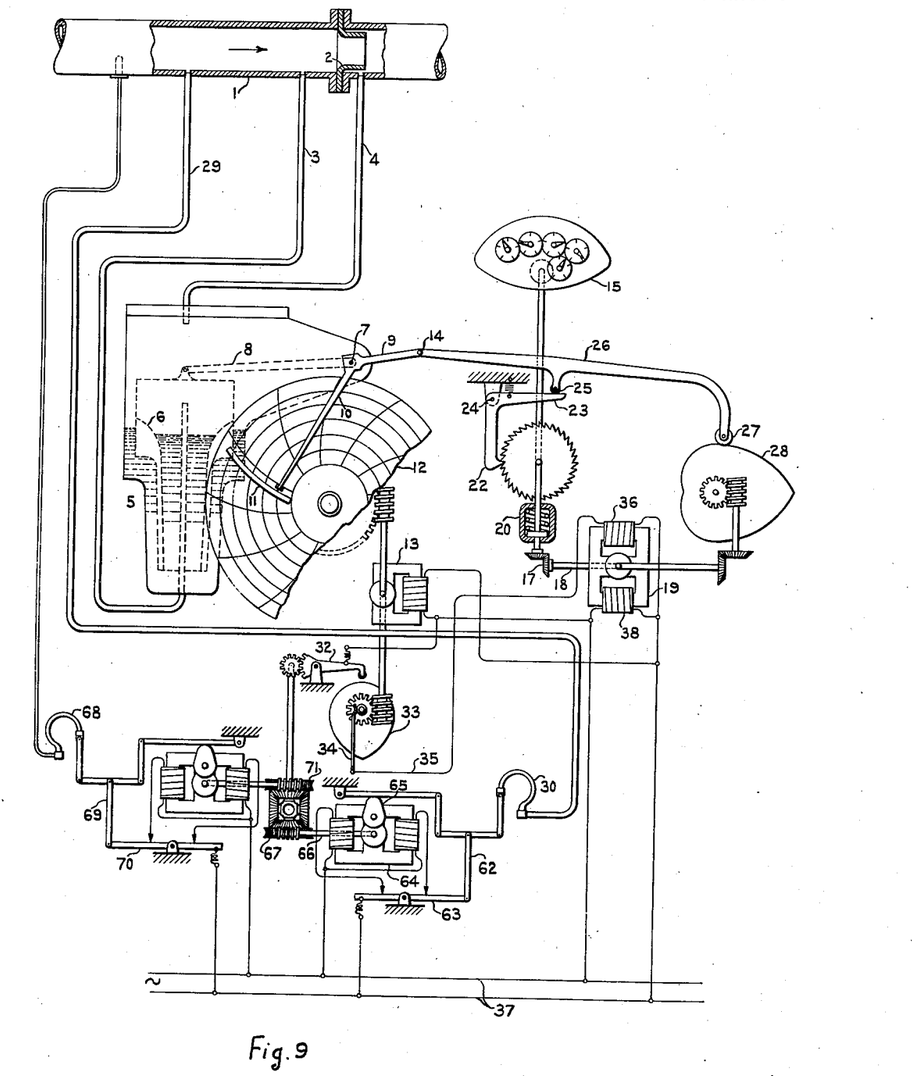
Fig. 9 illustrates diagrammatically a modification of Fig. 2 wherein a flow meter is corrected for variations in both temperature and pressure.

Fig. 9 illustrates an embodiment wherein both pressure and temperature compensation is applied to the metering arrangement of Fig. 1. The Bourdon tube 30, positioned responsive to pressure within the conduit 1, is adapted to vertically position a link 62 for angularly moving a contact bar 63 around a fixed pivot intermediate its ends. Normally, the contact bar 63 completes circuit from the power source 37 to both fields of an opposed field motor 64; the motor adapted, when one field is deenergized, to position a cam 65 and a shaft 66, the latter driving a worm-wheel 67 to one element of a differential gear. Pressure changes are reflected by vertical positioning of the link 62 from the Bourdon tube 30 and corresponding angular positioning of the contact arm 63 to open one or the other of the fields of the motor 64 and allow the motor to rotate in predetermined direction and in amount sufficient to turn the cam 65 whereby the link 62 is restored to its previous position and both fields of the motor 64 are reenergized, thereby plugging the motor to a substantially instantaneous stop.

A Bourdon tube 68 sensitive to temperature of the steam within the conduit 1 is adapted to vertically position a link 69, for angularly positioning a contact bar 70, similar in manner to that explained relative to the Bourdon tube 30, and for actuating a worm-wheel 71 forming the complementary member of the differential gear before mentioned.

Movement of the worm-wheels 67, 71 may be simultaneous or at different times and in the same or opposite direction, with the resultant positioning applied to a contact bar 32 relative to a continuously rotated contact cam 33. Thus the control of the field 36 of the motor 19 is under the joint control of temperature and pressure variations in the conduit 1.

It is, of course, to be understood that the fluid flowing through the conduit 1 need not be steam or water, but may be any fluid; that the variable conditions or qualities need not be temperature or pressure; and, in fact, the quantity to be compensated need not be a fluid flow.

While I have illustrated and described certain preferred embodiments of my invention, it is to be understood that I am to be limited only by the claims.

What I claim as new, and desire to secure by Letters Patent of the United States, is:

1. Apparatus comprising a member adapted to be freely positioned within limits in a plane, for effecting an integration, one end of the member positioned between limits in accordance with a function of a variable such as the rate of flow of a fluid, a time cam rotated at a constant speed, the other end of the member periodically reciprocated at a substantially uniform rate along a given path in a plane by the time cam, and means for periodically stopping the time cam if a condition of the fluid deviates from predetermined value, the length of stoppage during each period determined by the amount of deviation.

2. Measuring apparatus comprising in combination, a rate of flow meter of a fluid, an element, said meter adapted to move said element in linear relation to rate of fluid flow, a time responsive element, a member positioned by the first-named element, and by the time responsive element, and means under the joint control of a plurality of variable conditions of the fluid for controlling the time responsive element.

3. An integrator comprising a revoluble surface, a synchronous motor for actuating said surface, a traction wheel frictionally engaging said surface, a meter sensitive to the magnitude of a variable adjusted to move said wheel radially with relation to said surface, integrating mechanism operated by said wheel, and means for periodically stopping said motor for increments of time in accordance with the magnitude of a condition of said variable.

4. Apparatus for integrating a variable such as the rate of flow of a fluid with respect to time, comprising, a register, a constant speed normally operating motor for operating said register, a member positioned corresponding to the magnitude of the rate of fluid flow, means under the control of said member for cyclically effecting an operation of said register by said motor an amount proportional to the rate of fluid flow; and means for compensating the integration of said rate of flow for changes in a condition comprising means cyclically originating electric impulses of a time duration corresponding to the magnitude of said condition and means under the control of said impulses for stopping said motor for the duration of said impulses.

5. Apparatus for integrating a variable such as the rate of flow of a fluid with respect to time, comprising, a motor having opposed windings, one of said windings continuously energized whereby said motor normally rotates in a given direction and when the opposed winding is energized said motor is rendered inoperative, a register adapted to be driven by said motor, means including means responsive to the rate of fluid flow for cyclically producing an actuation of said register by said motor corresponding to the rate of fluid flow; and means for compensating the integration of said rate of fluid flow for changes in a condition comprising, an electric circuit including said opposed winding, means responsive to said condition, motor means continuously operable at substantially constant speed, and means controlled jointly by said last two named means to cyclically energize said circuit for a time duration corresponding to said condition whereby said motor is periodically rendered inoperative for increments of time corresponding to the magnitude of said condition.

6. In a mechanism for integrating a variable such as the rate of flow of a fluid with respect to time, in combination, a synchronous motor having a normally energized winding producing rotation of said motor in a given direction, a register adapted to be actuated by said motor when rotated in the given direction, means including means responsive to the rate of flow of the fluid for periodically producing a movement of said register by said motor corresponding to the rate of fluid flow, an opposed winding for said motor which when energized renders said motor inoperative, and means for periodically energizing said opposed winding for a time duration corresponding to the magnitude of a condition of the fluid whereby the frequency of said periodic movements of said register is varied in correspondence with changes in the magnitude of said condition.

7. Apparatus for producing a total displacement of a member over an extended period of time proportional to the integral of the instantaneous value of a first variable such as rate of fluid flow with respect to time during that period of time modified by changes in the instantaneous magnitude of a second variable during that period of time comprising, a movable member, a constant speed normally operating motor for moving said member, a second member positioned corresponding to the rate of fluid flow, means under the control of said second member for cyclically effecting a displacement of said first named member by said motor an amount proportional to the rate of fluid flow; and means for compensating the displacement of said first named member for changes in said second named variable comprising, means cyclically originating electric impulses of a time duration corresponding to the magnitude of said second variable, and means under the control of said impulses for stopping said motor for the duration of said impulses.

HARRY E. WEAVER.